United States Patent
Al Ghatta

[11] Patent Number: 5,852,134
[45] Date of Patent: Dec. 22, 1998

[54] POLYMERIC ALLOYS FROM POLYESTER RESINS AND PROCESS FOR THEIR PRODUCTION

[75] Inventor: Hussain Ali Kashif Al Ghatta, Fiuggi, Italy

[73] Assignee: Sinco Engineering S.p.A., Italy

[21] Appl. No.: 761,016

[22] Filed: Dec. 5, 1996

Related U.S. Application Data

[63] Continuation of Ser. No. 528,135, Sep. 14, 1995, abandoned, which is a continuation of Ser. No. 244,962, filed as PCT/EP93/02834 Oct. 14, 1993 published as WO94/09069 Apr. 28, 1994, abandoned.

[30] Foreign Application Priority Data

Oct. 15, 1992 [IT] Italy .................................. MI92A2373

[51] Int. Cl.$^6$ .............................. C08L 67/02; C08L 77/00
[52] U.S. Cl. .......................... 525/397; 525/425; 525/437; 525/439; 525/537
[58] Field of Search ..................................... 525/425, 397, 525/437, 439, 537

[56] References Cited

U.S. PATENT DOCUMENTS

| | | | |
|---|---|---|---|
| 3,015,651 | 1/1962 | Kjelimark | 528/491 |
| 3,959,215 | 5/1976 | Schneider | 525/437 |
| 4,778,858 | 10/1988 | Ginnings | 525/425 |
| 4,891,406 | 1/1990 | Bittscheidt | 525/64 |

FOREIGN PATENT DOCUMENTS

| | | |
|---|---|---|
| 0422282 | 4/1991 | European Pat. Off. . |
| 1-272660 | 10/1989 | Japan . |

*Primary Examiner*—Patricia A. Short
*Attorney, Agent, or Firm*—Edward D. Manzo; Mark J. Murphy

[57] ABSTRACT

A process for the preparation of polymeric alloys from polyester resins and polymers containing groups capable of giving addition reaction with functional compounds containing at least two reactive groups comprising the melt state mixture stage of polyester resin, reactive polymer and functional compound of mixture pelletizing and following polyaddition reaction in the solid state at temperatures between 150° and 220° C. to obtain an increase of the polymer intrinsic viscosity of 0.1 dl/g in comparison with the starting polyester resin.

2 Claims, No Drawings

POLYMERIC ALLOYS FROM POLYESTER RESINS AND PROCESS FOR THEIR PRODUCTION

This is a continuation of application Ser. No. 08/528,135 filed on Sep. 14, 1995, now abandoned, which is a continuation of application Ser. No. 08/244,962, filed as PCT/EP93/02834 Oct. 14, 1993 published as WO94/09069 Apr. 28, 1994, now abandoned.

The present invention relates to an improved process for the preparation of polymeric alloys from polyester resins and polymers containing reactive end groups.

The polymeric alloys from polyester resins and from resins such as polycarbonate, polyamides were so far obtained by blending in the molten state optionally operating in the presence of functional compounds able to react with the resin end groups.

The properties of these alloys are not satisfactory due to side reactions such as transesterification, transamidation and degradation, which occur in the molten state. Due to the degradation reactions, it was not possible moreover to prepare resins with molecular weight high enough to enable good mechanical properties of the polymeric alloys.

A method has now been found which allows to prepare polymeric alloys with unexpectly high mechanical properties by reacting resins mixtures at the solid state in the presence of a polyfunctional compound containing at least two groups capable of reacting with addition reactions with the resins end groups.

The polyester resin, the resin containing reactive groups and the functional compound are blended in the molten state; the mixture is then pelletized and the chips are then subjected to the solid state polyaddition reaction.

The polyaddition reaction in the solid state is generally preceded by a crystallization step carried out after the melt state mixture stage and after the following pelletizing. The crystallization step is carried out to prevent agglomeration phenomena of chips and/or of sticking on the reactor wall during the reaction in the solid state.

The crystallization step is carried out at temperatures higher than the TG of the polyester and comprised in general between 130° and 180° C.

The process of alloys preparation is preferably carried out in continuous way using continuous crystallizers and polyaddition reactors where the chips are fed counter currently to a stream of a heated gas, e.g. air, nitrogen and other inert gas, such as carbon dioxide. The polyaddition reaction in the solid state is carried out at temperatures higher than 150° C. and lower than the melting point of the polyester resins. The temperatures are in general comprised between 180° and 210° C. The residence time depends on the increase of the required intrinsic viscosity and of the mechanical properties. The viscosity increase is at least 0.1 dl/g in comparison with the starting polyester resin. The treatment is carried out in an inert gas stream in a fluid bed or fluidized reactor.

The polyfunctional compound is preferably selected from the group consisting of pyromellitic acid dianhydride, 3,3'4,4'biphenyltetracarboxylic acid, bis (3,4-dicarboxyphenyl) ether, bis (3,4 dicarboxyphenyl) thioether, 3,4 dicarboxylic acid, bisphenol A, 2,2-bis (3,4 dicarboxyphenyl) hexafluoropropane, 2,3,6,7 naphtalenetetracarboxylic acid, bis (3,4 di-carboxyphenyl) sulfone, 1,2,5,6-naphtalenetetracarboxylic acid, 3,2'3,3'-biphenyltetracarboxylic acid, bis (3,4 dicarboxyphenyl) sulfoxide, 3,4,9,10-perylene tetracarboxylic acid and mixtures thereof.

The aromatic dianydrides most preferred are the pyromellitic dianydride and 3,3'4,4'benzophenonetatracarboxylic acid dianydride and mixtures thereof.

Besides the dianydrides of the above mentioned tetracarboxylic aromatic acids can be also used the dianydrides of aliphatic, cycloaliphatic and tetrahydrofurantetracarboxylic acids.

Representative compounds are 1,2,3,4 cyclobutanetetracarboxylic acid and tetrahydrofuran 2,3,4,5-tetracarboxylic acid.

The blending of the polyester resin with the resins containing reactive end groups and with polyfunctional compound is preferably carried out in corotating or counter rotating, intermeshing or not intermeshing twin screw extruders with or without degassing equipment, at a temperature between 200° and 350° C. depending on the melting point of the mixture of the polymers.

A counter rotating and not intermeshing screws extruder is preferred.

The use of such a type of extruder allows to perform a good distribution of the polyfunctional compound in the melt and to avoid problems of local high concentration of the additive due to its high reactivity.

This type of extruder allows very short residence times.

The extruder is preferably connected with a high vacuum oil seal pump to maintain a vacuum higher than 2 tor to carry out the dosing of the reactive mixture and to obtain a resin with a low content of acethaldehyde.

The preferred concentration of additive with respect to the polyester resin is 0.05–1% by weight.

The residence time in the extruder can be comprised between 10 and 120 sec. preferably 15–30 sec.

To avoid random local concentrations of additive in the melt it is advisable to dilute the additive with crystallized PET powder (1 part of additive to 3 parts of PET powder).

This procedure ensures a homogeneous distribution of additive leading to a better reproducibility of the end product intrinsic viscosity and inhibiting gel formation.

The additive may also be diluted using crystallized PET chips (1 part additive to 10 parts of PET chips).

The blending could be performed in a fanned blender using 0.1% by weight of adhesive agent.

The polyester resins usable in the invention process are the product of polycondensation of glycols with 2–10 carbon atoms, such as ethylene glycol, 1,4-butileneglycol, 1,4 cyclohexylenglycol, with terephthalic acid or derivatives thereof such as dimethylterephthalate, as well as the polycondensation products containing besides units deriving from terephthalic acid, also units deriving from other bicarboxylic acids such as naphthalendicarboxylic acids isophtalic acid, orthophtalic acid and 5-tert-butyl-1,3-benzenedicarboxylic acid in a quantity of about 0.5–25% mole of all acid units.

Among the polyester resins the elastomeric polyester resins are also included and in general are included block polyester copolymers containing blocks deriving from the polycondensation of a glycol with an aromatic bicarboxylic acid.

The starting polyester resin has an intrinsic viscosity lower than 0.8 dl/g and generally between 0.6 and 0.75 dl/g. The preferred resins are polyethylenterephthalate and copolyethylenterephthalates containing up to 20% of unit deriving from isophtalic acid. The reactive resins different from the polyester resins have end groups preferably selected among OH, $NH_2$, SH.

The polyamides are the preferred resins. These resins are characterized by the repeating unit —NH CO—; the ponderal molecular weights are generally included between 10,000 and 50,000. Examples of these resins are Nylon 4, Nylon 6,6, Nylon 6, Nylon 8, Nylon 11, Nylon 12.

Other examples of usable resins are polycarbonate, polyphenylenoxide and polysulphide resins. The reactive resins are used in a quantity of about 1–50% preferably 5–20% by weight: on the weight of the mixture.

The alloys obtained using polyamides are characterized by a very high elastic module without sacrificing the tensile strength and elongation at break. Films obtained from alloys prepared starting from polyamides, present values of the elastic modulus varing between 4.2 and 5 GPa following the stretch ratio in the range between 3–5, while the reference polyester shows values in the range between 3.3 and 2.2 GPa and the alloys obtained without using the polyfunctional compound (piromellitic dianydride) have values of the modulus in the range between 2.4–2.9 GPa.

The following examples are given to illustrate but not to limit the invention.

EXAMPLE 1

10 Kg/h of a mixture at 95% by weight of crystalline PET (IV=0.601 dl/g) and at 5% by weight of 6,6 Nylon (the mixture is dried vacuum at 140° C. for 10 h) were fed together at 0.05% by weight of pyromellitic dianhydride (PMDA) to a counter rotating and not intermishing twin screw extruder. The mixture was extruded and also pelletized. The chip intrinsic viscosity was 0.694 dl/g; the COOH groups content=52.2 eq/ton. The extrusion conditions were as follows:

Ratio length/diameter (L/D)=36

Screw speed=150 rpm

Cylinder temperature=260° C.

Chips feed speed=10 Kg/h

PMDA feed speed=0.05 Kg/h mould type=circular with 3 mm dia.

The so obtained chips were subjected to upgrading at 186° C. for 6 hours in nitrogen stream. The intrinsic viscosity after the treatment was of 0,927 dl/g and the COOH groups as 49 eq/ton.

The obtained polymer was then extruded continuously (before drying) in a monoscrew extruder for film. The film was collected on chilled rollers and then on rollers heated at 85° C. and then on collecting cylinder. The stretch ratio used was of 3:1 in a test, of 4:1 in a second test and of 5:1 in a third one.

The films mechanical properties are shown in table 1.

COMPARATIVE EXAMPLE 1

A mixture at 95% by weight of crystalline PET (IV=0,601 dl/g) and at 5% of 6,6 Nylon (dried vacuum at 140° C. for 10 h) was extruded and pelletized in the conditions as in example 1.

The chips were then subjected to upgrading under the same conditions as in example 1.

The obtained polymer intrinsic viscosity was of 0,786 dl/g and the groups concentration COOH of 21.4 eq/ton.

The chips were also extruded in the extruder for films of example 1 in the same conditions there indicated. The obtained film was collected with stretch ratio of 3:1, 4:1 and 5:1 in the different tests.

The film properties are shown in table 1

COMPARATIVE EXAMPLE 2

PET with IV=0.83 dl/g was filmed under the conditions of example 1 using the same stretch ratios.

The film properties are shown in table 1.

TABLE 1

| Stretch ratio | Module GP a | Tensile strength MP a | Max. strain % |
|---|---|---|---|
| Ex. 1 | | | |
| 3 | 4.2 | 94 | 14 |
| 4 | 4.9 | 163 | 42 |
| 5 | 5.0 | 183 | 22 |
| Ex. 1 comparison | | | |
| 3 | 2.4 | 71 | 91 |
| 4 | 1.9 | 113 | 61 |
| 5 | 2.9 | 189 | 24 |
| Ex. 2 comparison | | | |
| 3 | 3.3 | 103 | 155 |
| 4 | 3.8 | 142 | 69 |
| 5 | 2.2 | 230 | 23 |

The tensile strength was determined according to ASTM D-882 using a INSTRON tensile tester (Mod. 4505) on samples at 25° C. and with 50% of relative humidity.

The elastic modulus was determined from the slope at the stress-strain curve.

The intrinsic viscosity was determined in a solution of 0,5 g of polymer in 100 ml, of a solution at 60/40 by weight of phenol and tetraclorethane, operating at 25° C. according to ASTM D-4603-86.

I claim:

1. A process for the production of polymeric alloys, which comprises:

a) melt blending a polyester and a reactive polymer, selected from the group consisting of a polyamide, polycarbonate, polyphenyleneoxide and polysulphide resin, with a dianhydride of tetracarboxylic acid;

b) pelletizing the mixture;

c) solid state treating of the pellets at temperatures from 150° to 220° C. for a time sufficient to increase at least 0.1 dl/g the intrinsic viscosity of the alloy referred to the intrinsic viscosity value of the starting polyester resin.

2. A process according to claim 1, wherein the polyester resin is a polyethyleneterepthalate, the reactive polymer is a polyamide and the dianhydride of the tetracarboxylic acid is pyromellitic dianhydride.

* * * * *